United States Patent [19]
Olds et al.

[11] Patent Number: 5,548,800
[45] Date of Patent: Aug. 20, 1996

[54] SATELLITE TELECOMMUNICATION SYSTEM WITH APPARATUS FOR PROTECTING RADIO ASTRONOMY AND METHOD OF USING SAME

[75] Inventors: Keith A. Olds, Mesa, Ariz.; Christopher N. Kurby, Elmhurst, Ill.

[73] Assignee: Motorola, Inc., Schaumburg, Ill.

[21] Appl. No.: 254,012

[22] Filed: Jun. 3, 1994

[51] Int. Cl.$^6$ .................................................. H04B 7/185
[52] U.S. Cl. ........................ 455/12.1; 455/13.2; 455/54.1; 455/58.2; 455/69; 342/357
[58] Field of Search .................................. 455/51.2, 54.1, 455/33.1, 12.1, 13.1, 13.2, 13.3, 63, 69, 70, 56.1, 58.2, 51.1; 379/40, 44, 47, 49, 92; 370/104.1; 342/357, 385

[56] References Cited

U.S. PATENT DOCUMENTS

| | | | |
|---|---|---|---|
| 4,162,488 | 7/1979 | Silverman et al. | 340/505 |
| 5,257,404 | 10/1993 | Goreham et al. | 455/51.2 |
| 5,327,572 | 7/1994 | Freeburg | 455/13.1 |

OTHER PUBLICATIONS

"Beacon Control Of Radio Transmitters To Reduce Radio Frequency Interference" by Timothy J. Landrud and John L. Nelson from vol. 16, Aug. 1992, Motorola Technical Developments.

Primary Examiner—Reinhard J. Eisenzopf
Assistant Examiner—Lee Nguyen
Attorney, Agent, or Firm—Walter W. Nielsen; Kevin K. Johanson

[57] ABSTRACT

A constellation of satellites distributed around the earth serves as a communication network that supports global communication of subscriber units. Subscriber units may potentially transmit from any location on earth. Some locations such as radio astronomy sites may be interfered with by nearby transmissions from subscriber units. Subscriber units located within a potentially interfering proximity to radio astronomy sites are prohibited from transmitting potentially interfering signals by reception of a non-interfering beacon at radio astronomy sites. The beacon repeatedly transmits a synchronous control signal with a subscriber unit's servicing satellite's control signal. The beacon's control signal is compatible with a subscriber unit's communication receiver. Control signal information contained in a beacon control signal inhibits the subscriber unit from transmitting.

18 Claims, 8 Drawing Sheets

FIG. 5
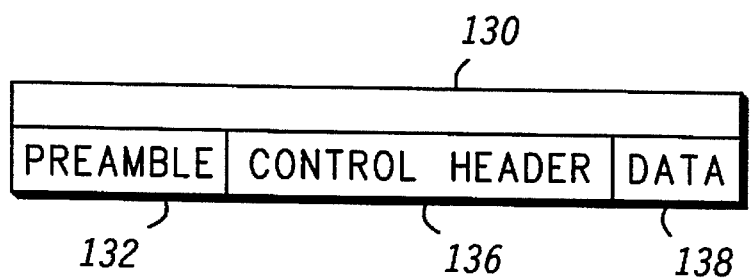
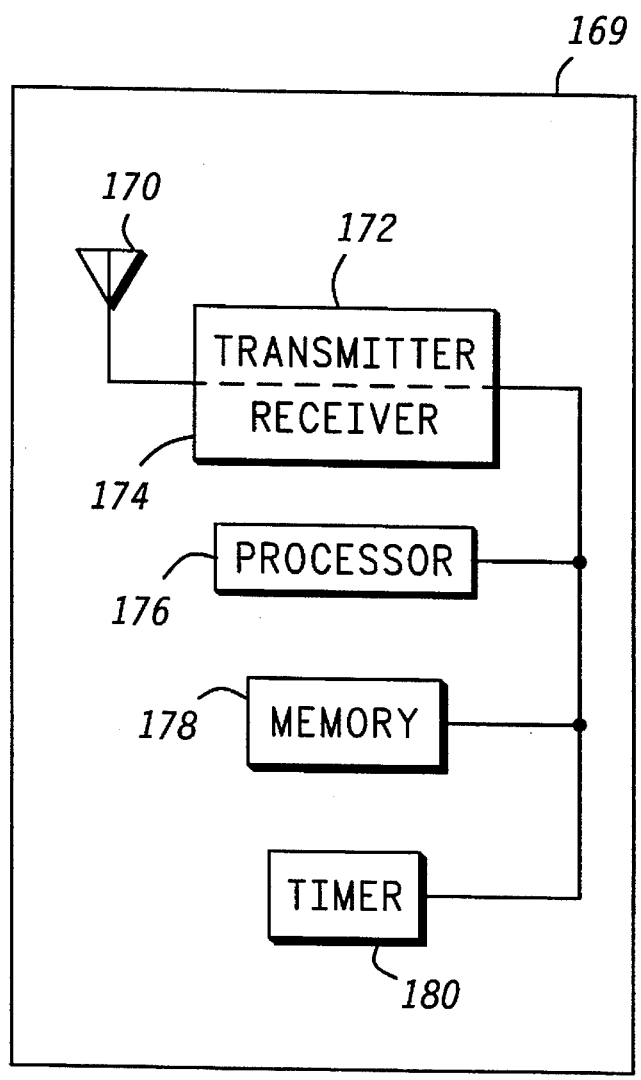
FIG. 6

5,548,800

SATELLITE TELECOMMUNICATION SYSTEM WITH APPARATUS FOR PROTECTING RADIO ASTRONOMY AND METHOD OF USING SAME

FIELD OF THE INVENTION

The present invention relates generally to satellite-based telecommunications, and, more particularly, to protection of radio astronomy sites from interfering transmissions by subscriber units.

BACKGROUND OF THE INVENTION

Radio astronomy is one of the most sensitive methods of astronomy in operation today. Radio astronomy employs large antennas or arrays of antennas to gather very faint radio frequency signals emitted by stars or meteors. These faint signals are then coherently combined to produce a resolvable image.

While this technique can resolve stars invisible to the human eye or even large aperture optical telescopes, radio astronomy is very susceptible to interference. Near-field competing spectrum devices such as cellular phones and other transmitters, although generally portable and low-power, produce substantially higher received power levels than cosmos-attenuated signals generated many light years away.

To combat the interference problems associated with fixed-site transmitters, radio astronomy sites are generally located in remote areas to allow attenuation of manmade interfering signals. Radio astronomy has also enjoyed restricted frequency sharing of radio astronomy bands. However, the surge in portable telephony with its frequency encroachment presents additional challenges that cannot be solved by further isolating astronomy sites.

A typical radio astronomy site combats the problems as described above by disallowing the transmission of potentially interfering signals within a prescribed boundary. This prevention technique breaks down, however, as portable transmitters become more powerful and utilize additional frequency spectrum.

One solution known in the prior art is to generate a local beacon signal at the radio astronomy site. This local beacon emits a receivable signal throughout the vicinity of the radio astronomy site. This solution is bulky and expensive because of the additional special receiver required to detect a special beacon signal.

Thus, what is needed is a beacon system capable of providing beacon protection near a radio astronomy site, but not requiring special receivers.

Also, what is needed is a low-cost, effective method of providing beacon protection to a radio astronomy site that does not require additional subscriber unit receiver circuitry.

BRIEF DESCRIPTION OF THE DRAWINGS

FIG. 5 shows the data format of a control signal used to control subscriber units, in accordance with an embodiment of the present invention.

FIG. 6 shows a block diagram of a subscriber unit capable of receiving signals from a satellite or a beacon, in accordance with an embodiment of the present invention.

DESCRIPTION OF THE PREFERRED EMBODIMENT

Figure 1:
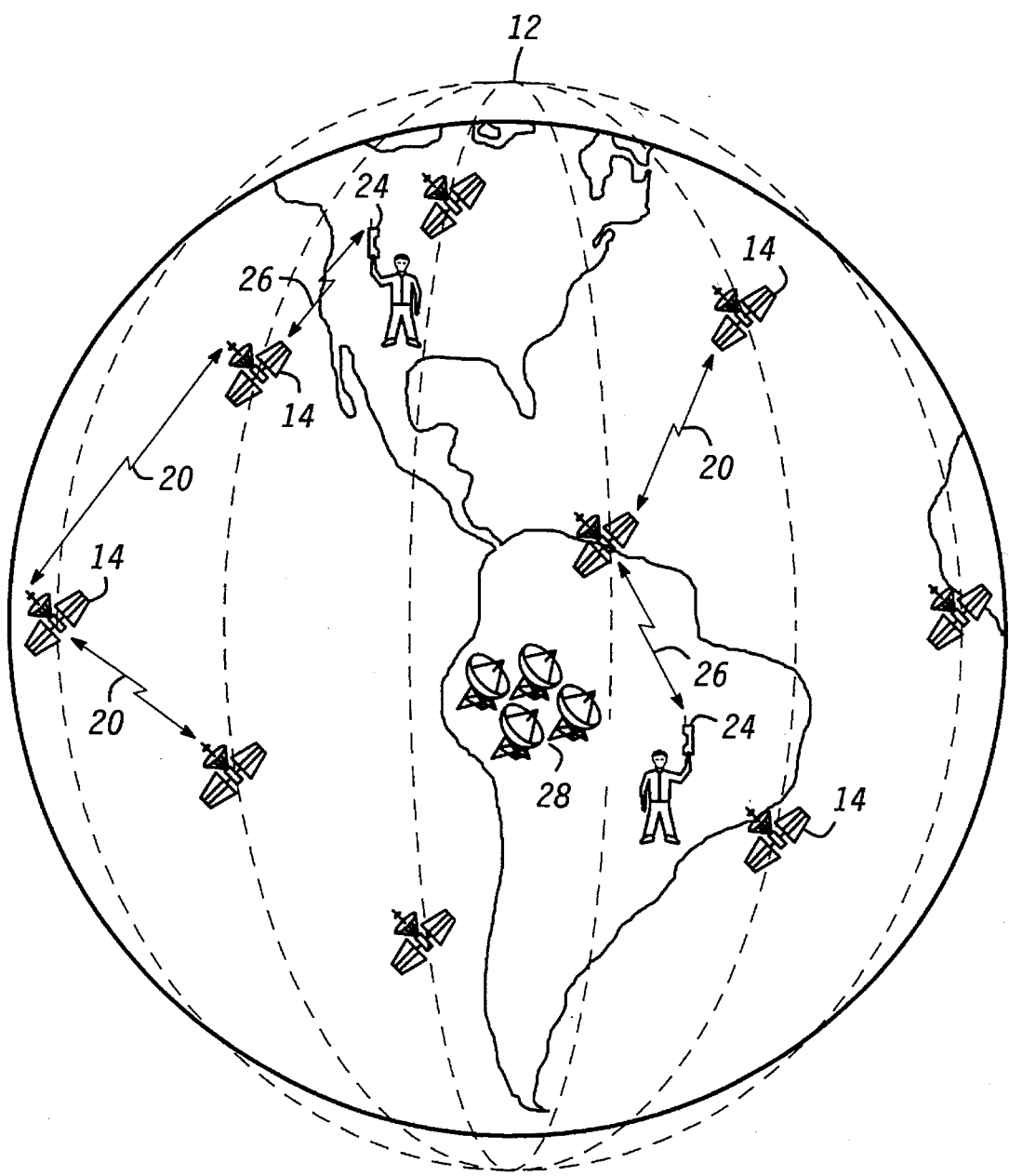
FIG. 1 depicts a global telecommunication system, in accordance with an embodiment of the present invention.

FIG. 1 depicts a global telecommunication system, in accordance with an embodiment of the present invention. Satellite-based communication network 10 includes a constellation 12 consisting of multiple satellites dispersed around the earth. In a preferred embodiment, satellites 14 are in low-earth orbits. Satellites 14 communicate with each other through cross-links 20.

Network 10 also includes subscriber units 24. Subscriber units 24 may be mobile, portable, or fixed site interfaces to satellite 14. Subscriber units 24 interface with satellites 14 using down-links 26. Communication signals transmitted from subscriber unit 24 to satellite 14 are routed, if necessary for proper delivery, to adjacent satellites 14 through cross-links 20.

Radio astronomy site 28 receives cosmic signals from directed points in space. Site 28 historically has been remotely located away from interfering signals. With subscriber units 24 becoming mobile and ubiquitous, interference at radio astronomy site 28 from subscriber unit 24 is possible. If subscriber unit 24 transmits near site 28, it may interfere with the received cosmic signals, causing false readings during a radio astronomy session.

Figure 2:
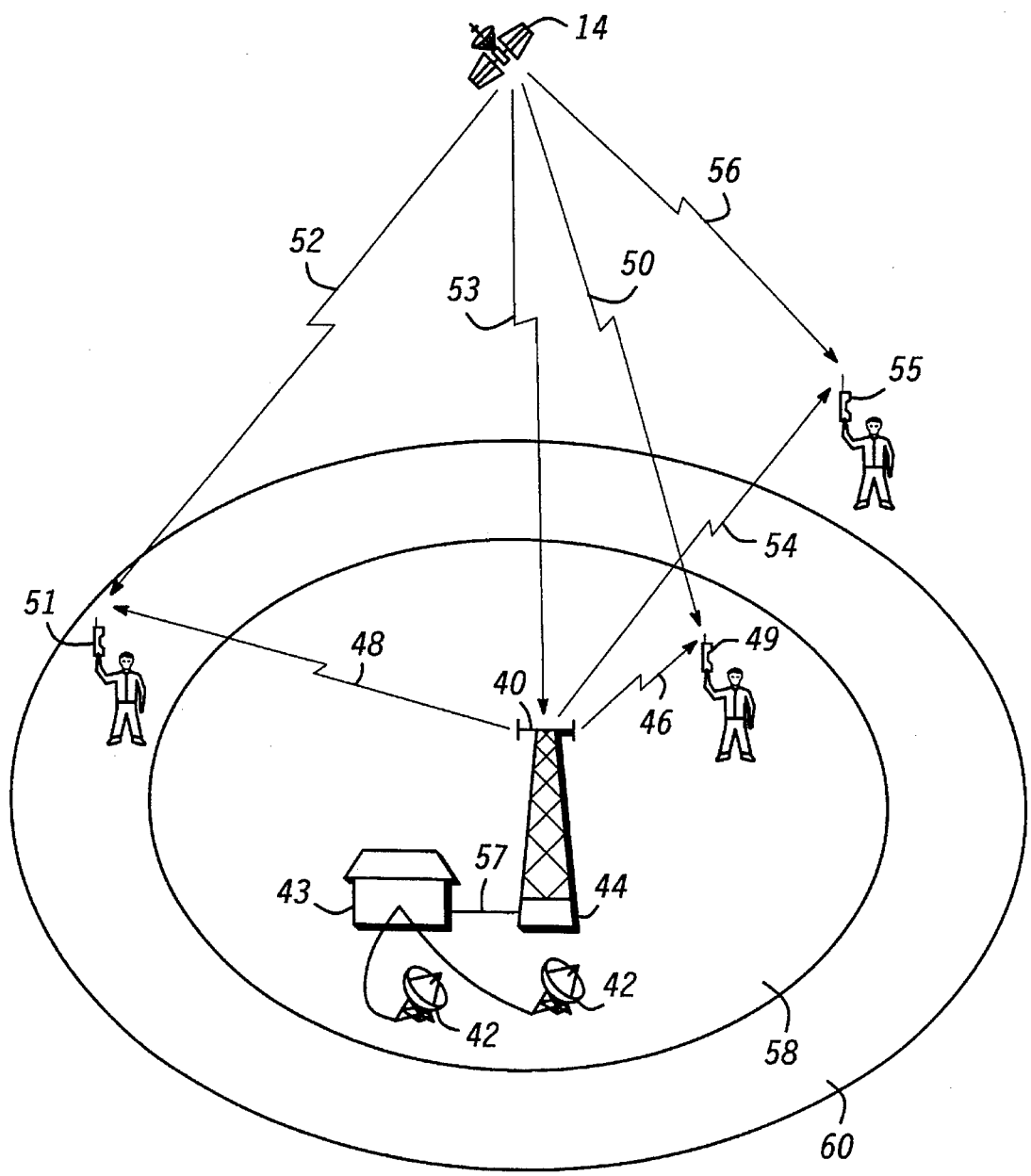
FIG. 2 shows typical communication paths between a satellite, subscriber units and a radio astronomy site, in accordance with an embodiment of the present invention.

FIG. 2 shows typical communication paths between a satellite, subscriber units and a radio astronomy site, in accordance with an embodiment of the present invention. Satellite 14 orbits the earth, potentially communicating with subscriber units 49, 51, and 55. Satellite 14 also repeatedly broadcasts a common satellite control signal (whose signal paths to subscriber units 49, 51 and 55 are indicated by reference numbers 50, 52, and 56, respectively) to all subscriber units within its view. Each subscriber unit receives a common satellite control signal 50, 52, and 56 through a unique propagation path. Some propagation paths may be closer to satellite 14, and some will be further away.

Common satellite control signal 50, 52, and 56 may contain general control information and instructions (see FIG. 5) for all subscriber units serviced by satellite 14, or specific control information and instructions for specific subscriber units serviced by satellite 14. Control information and instructions may contain information such as a specific subscriber unit's ID number. This ID number would alert and activate a subscriber unit into reception of an incoming call. Control information could also include a listing of available transmit frequencies available to subscriber units.

Radio astronomy site 28 (FIG. 1) includes radio astronomy center 43 and radio astronomy antenna 42. Center 43 processes received cosmic signals from radio astronomy antenna 42. For effective radio astronomy, interfering frequencies must have sufficiently low power levels at site 28. Protection zone 58 defines an area wherein transmitting subscriber units would produce sufficiently powerful signals to cause interference at site 28. One skilled in the art would understand that the size of protection zone 58 varies with the transmit power level of subscriber units. In other words, subscriber units capable of transmitting higher power levels must be further away from site 28 to prevent interference. Therefore, protection zone 58 would need to be larger. The radius of protection zone 58 may be adjusted by varying the power level of beacon system 44.

Installation and activation of beacon system 44 at site 28 establishes protection zone 58. System 44 connects to center 43 through control/status interface 57. Interface 57 performs general functions such as (i) indicating to beacon system 44 when a radio astronomy session is beginning, (ii) responding to radio astronomy center 43 when beacon system 44 is operative, and, in an alternate embodiment, (iii) providing universal time to beacon system 44. One skilled in the art would understand that interface 57 provides only status and control signals and therefore these signals would not be necessary if beacon system 44 were constantly enabled or if beacon system 44 were manually controlled and monitored.

Beacon system 44 activates when center 43 initiates a radio astronomy session or, in the case of a continuous beacon, when system 44 is installed. In a preferred embodiment, beacon system 44 when initiated, receives satellite control signal 53. This initial sampling of satellite control signal 53 allows beacon system 44 to synchronize beacon control signals for simulcasting with satellite control signals. System 44 transmits a common beacon control signal through beacon antenna 40 to all subscriber units within its view. The beacon signal is essentially identical in frequency modulation and format to the satellite control signal. Beacon system 44 transmits repeated beacon control signals using a frequency that does not interfere with radio astronomy. In the preferred embodiment, both the satellite control signal and the beacon control signal are broadcast as periodic bursts followed by a fixed-duration time delay. One skilled in the art would understand that control signals may be transmitted continuously without a fixed-duration time delay.

Beacon control signal (whose signal paths to subscriber units 49, 51 and 55 are indicated by reference numbers 46, 48, and 54, respectively) contains general control information and instructions (see FIG. 5) for all subscriber units. Such information and instructions limit nearby subscriber unit's functionality by "over-powering" satellite control signals with subscriber unit transmission-limiting beacon control signals.

Beacon control signal 46, 48, and 54 attenuates as it propagates away from beacon antenna 40. Beacon control signals contain subscriber unit transmission-limiting information. Beacon control signal 46, as received by subscriber unit 49 within protection zone 58, has a higher received power level than satellite control signal 50 and therefore dominates satellite control signal 50. Subscriber unit 49, within protection zone 58, captures common beacon control signal 46 as transmitted through beacon antenna 40. Subscriber unit 49 thus receives its control signal instructions and information from beacon system 44 rather than from satellite 14.

Partially attenuated beacon control signal 48 as received by subscriber unit 51 has a received power level comparable with satellite control signal 52. Subscriber units receive and capture those control signals having significantly higher received power levels. Control signals having comparable power levels interfere with each other. Non-capture region 60 defines the area where comparable-power-level control signals 48 and 52 interfere with each other. subscriber unit 51, in non-capture region 60, cannot capture a valid control signal and extract control information. Subscriber units must be capable of capturing a control signal before they may operate in network 10. Thus subscriber unit 51 cannot transmit radio astronomy-interfering signals while located in non-capture region 60.

Subscriber unit 55 receives greatly attenuated beacon control signal 54 and a less attenuated satellite control signal 56. Subscriber unit 55 captures non-transmission-limiting control signal information as transmitted by satellite 14. Thus distant subscriber unit 55 may transmit freely without interference to radio astronomy site 28.

Figure 3:
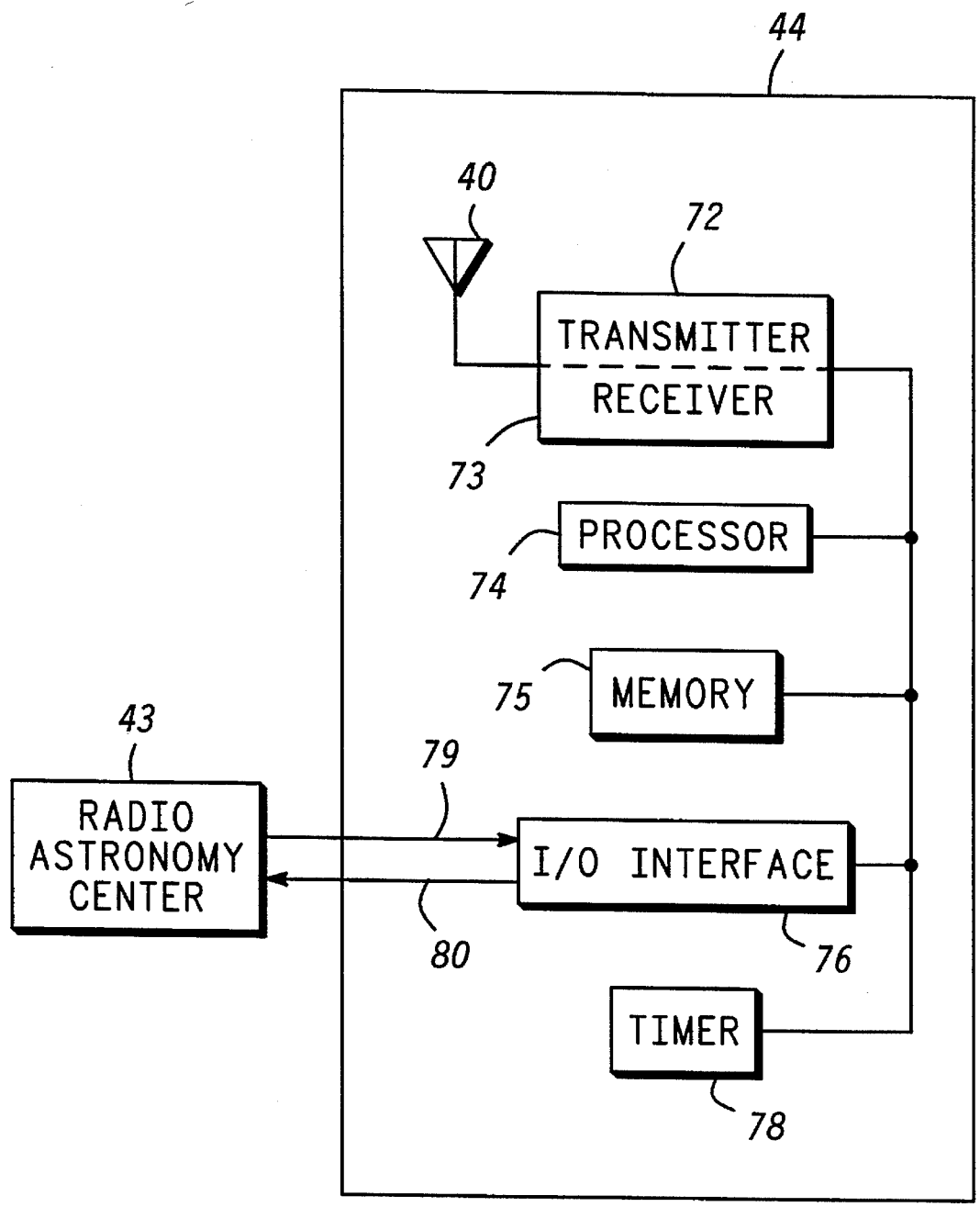
FIG. 3 shows a block diagram of a preferred embodiment of a beacon system capable of receiving signals from a satellite and further capable of interfacing to a radio astronomy center and transmitting a beacon control signal to a subscriber unit.

FIG. 3 shows a block diagram of a preferred embodiment of a beacon system capable of receiving signals from a satellite and further capable of interfacing to a radio astronomy center and transmitting a beacon control signal to a subscriber unit.

Radio astronomy center 43 activates beacon system 44 by asserting activate beacon signal 79. Activate beacon signal 79 is detected by I/O interface 76. I/O interface 76 interfaces to processor 74. Beacon status 80, output by beacon system 44, indicates that beacon system 44 is operative. One skilled in the art would understand that activate signal 79 could be a power switch to beacon system 44 or any other input to beacon system 44 requesting beacon service. Additionally, beacon status 80 could be any indicator or could be absent if desired.

Beacon system 44 also comprises beacon antenna 40, receiver 73, and transmitter 72. Beacon antenna 40 may be any suitable antenna capable of emanating and receiving beacon frequencies. Beacon antenna 40 must also be capable of propagating the desired pattern to create a suitable protection zone 58.

In a preferred embodiment, beacon system 44 includes a receiver 73. Upon activation of beacon system 44, receiver 73 captures satellite control signal 53 (FIG. 2). Satellite control signal 53, as mentioned above, synchronizes the simulcast of beacon control signal 46, 48, and 54 with satellite control signal 50, 52, and 56.

Transmitter 72 transmits a beacon control signal 46, 48, and 54. The power level of transmitter 72 may be adjusted to provide sufficient beacon control signal levels to all subscriber units within protection zone 58.

Processor 74 and memory 75 are coupled together to perform sequencing and execution functions and to process and generate information contained in satellite and beacon control signals. Timer 78 generates a delay period to processor 74 for transmission of subsequent delayed beacon control signals. One skilled in the art would understand that known embodiments in the art of processor 74 have an internal timer 78.

Figure 4:
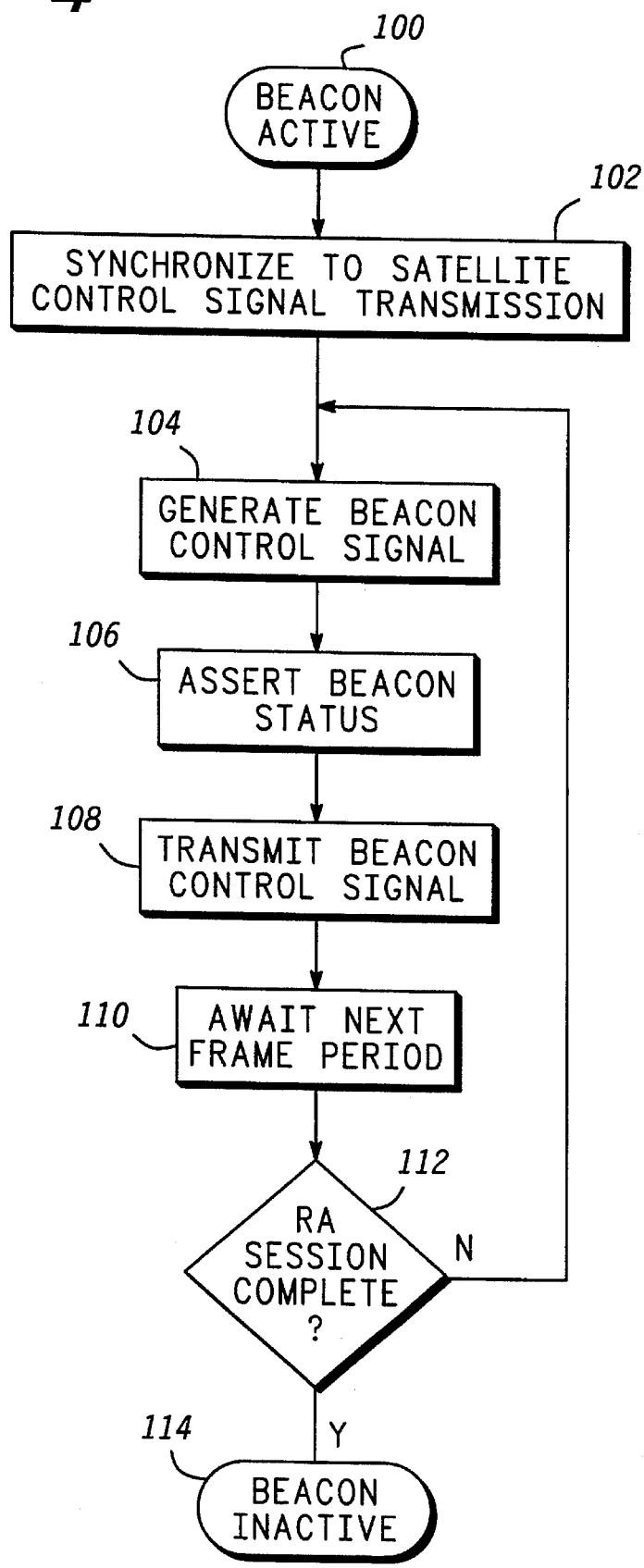
FIG. 4 shows a flowchart of a beacon system's process of denying transmission opportunities to subscriber units while in a protection zone during a radio astronomy session, in accordance with a preferred embodiment of the present invention.

FIG. 4 shows a flowchart of a beacon system's process of denying transmission opportunities to subscriber units while in protection zone 58 during a radio astronomy session in accordance with a preferred embodiment of the present invention. When beacon active procedure 100 is first entered, a task 102 is performed to synchronize beacon system 44 by using satellite control signal 53. Beacon system 44 synchronizes with the reception of satellite control signal 53. This synchronization allows the higher powered beacon control signal 46 to over-power satellite control signal 50 in protection zone 58.

After task 102, a task 104 generates a beacon control signal 130 (FIG. 5). Beacon control signal 130 comprises control information and instructions that prohibit subscriber unit 49 from transmitting while in protection zone 58. Beacon control signal 130 also contains preamble data for aiding subscriber units in capturing control signals.

After task 104, a task 106 asserts beacon status 80. Beacon status 80 may be used by radio astronomy center 43 to initiate actual radio astronomy reception. One skilled in the art would understand that status information is not required to practice the present invention.

Following task 106, a task 108 transmits a beacon control signal. Synchronized beacon control signal 46, arrives at subscriber unit 49 close in time to satellite control signal 50, and it will have a higher received power level and therefore be captured by subscriber unit 49.

After task 108, a task 110 activates a timer to generate accurate delay between subsequent beacon control signal transmissions. This delay could be created by separate timer 78 or by an internal timer in processor 74.

Following task 110, a query task 112 determines whether a radio astronomy session has completed. Completion of the session is detected by the removal of activate beacon signal 79. If the session has not terminated, then execution returns to task 104 for generation of another beacon control signal 130. If information in subsequent beacon control signals remains constant with the initial beacon control signal, then beacon control signal 130 may be stored and reused throughout the duration of a session or even across multiple sessions if signal information remains constant. If the session has completed, then processing transitions to a beacon inactive state 114.

FIG. 5 shows the data format of a beacon control signal or a satellite control signal used to control subscriber units, in accordance with an embodiment of the present invention. Control signal 130 comprises a preamble 132, control header 136, and data 138. Preamble 132 provides a recognizable pattern allowing subscriber unit receivers to capture or acquire control signals. Preamble 132 may be a fixed period of unmodulated carrier as in a preferred embodiment or a modulated carrier having a detectable pattern.

Control header 136 may contain a predetermined unique word, command information such as available transmission frequencies, or a myriad of conceivable control or instructional information.

Control signal 130 also contains data 138. Data 138 may contain subscriber-specific IDs, or a variety of valuable information for subscriber units. In a preferred embodiment, data 138 contains subscriber unit IDs having incoming calls. Subscriber unit 55, capturing satellite control signal 56 containing its ID, normally responds by transmitting to satellite 14. In a preferred embodiment, beacon system 44, during a radio astronomy session, generates and transmits beacon control signal 46 to subscriber unit 49. Higher-powered beacon control signal 46 is captured by subscriber unit 49 instead of lower-powered satellite control signal 50. The control header 136 of beacon control signal 46 contains either a control header 136 prohibiting subscriber unit 49 from transmitting or lists no available transmission frequencies.

Also in a preferred embodiment, data 138 may contain null subscriber unit IDs or, with a transmission disabling control header 136, data 138 may be omitted entirely. These omissions or invalid subscriber IDs "mask" any information about incoming calls to subscriber unit 49, and network 10 abandons the attempt to deliver any incoming call to subscriber unit 49.

FIG. 6 is a block diagram of a subscriber unit 169 capable of receiving signals from a satellite or a beacon, in accordance with an embodiment of the present invention. A subscriber unit 169 comprises an antenna 170 for providing transmission and reception signal gain, and it also includes a transmitter 172 and receiver 174. Transmitter 172 transmits information to satellite 14 for routing in network 10. Receiver 174 receives satellite control signals among other signals. Receiver 174 is also capable of receiving beacon control signals. This dual capability of receiver 174 simplifies a subscriber unit 169 by eliminating the need for a separate beacon specific receiver, thus minimizing any cost increase.

Processor 176 and memory 178 are coupled together to perform sequencing and execution functions in a typical manner. Timer 180 generates a delay period to processor 176 for reception of subsequent control signals. One skilled in the art would understand that known embodiments in the art of processor 176 have an internal timer 180.

Figure 7:
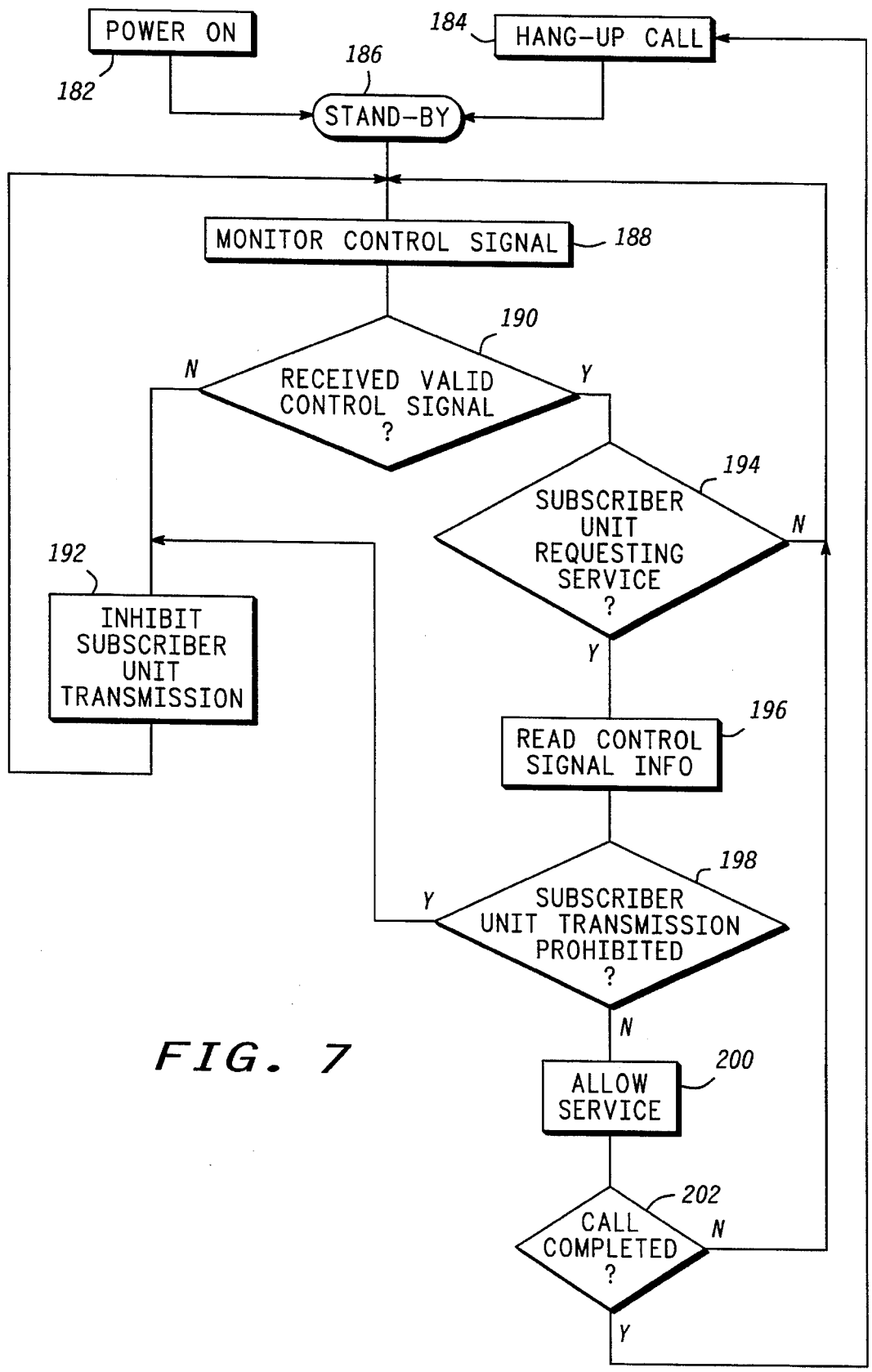
FIG. 7 shows a flowchart of a subscriber unit processing a received control signal, in accordance with an embodiment of the present invention.

FIG. 7 shows a flowchart of a subscriber unit processing a received control signal, in accordance with an embodiment of the present invention. A stand-by procedure 186 is entered from either completion of a power on task 182 or completion of a hang-up call task 184. When stand-by procedure 186 is first entered, a task 188 is performed to monitor control signal 130. Task 188 includes capturing control signal 130 with receiver 174 by first acquiring preamble 132 and through other steps outside the scope of the present invention which are well known to those of skill in the art.

After task 188, a query task 190 determines whether a valid control signal was received. Interference in non-capture region 60, as described in FIG. 2, may cause control signal information to be invalid. If received control signal information is not valid, then a task 192 inhibits transmission from subscriber unit 169. After task 192, processing returns to task 188 to monitor subsequent control signals.

If query task 190 determines that a valid control signal 130 was received, then processing passes to query task 194 to determine if subscriber unit 169 is requesting transmission service. If subscriber unit 169 is not requesting service, then processing returns to task 188 to monitor subsequent control signals.

If query task 194 determines that subscriber unit 169 is requesting service, then a task 196 performs additional processing on control signal 130 to extract control information. Following task 196, a query task 198 determines whether control header 136 or data 138 prohibits transmission from subscriber unit 169. If transmission is prohibited, meaning that a beacon control signal was received by subscriber unit 169, then a task 192 inhibits subscriber unit 169 from transmitting.

If query task 198 determines that subscriber unit 169 is not prohibited from transmitting, meaning that a satellite control signal was received by subscriber unit 169, then a task 200 allows subscriber unit 169 transmission service to satellite 14 and access to network 10.

After task 200, a query task 202 determines whether subscriber unit 169 has completed its call. If the subscriber unit's call is not completed, then task 188 is performed to monitor and receive another control signal. If subscriber unit's call is completed, then task 184 hangs up the call and returns to stand-by procedure 186.

Figure 8:
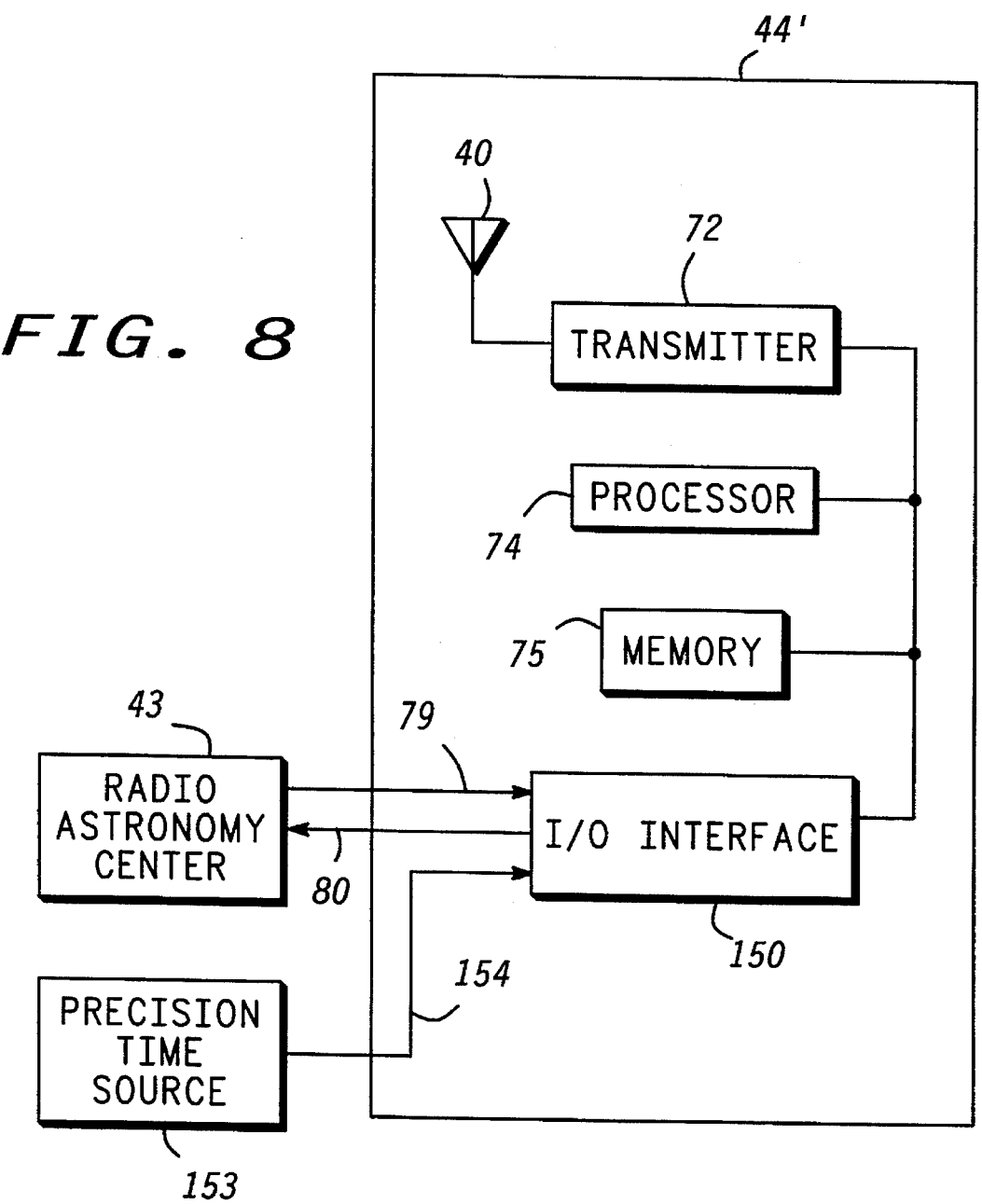
FIG. 8 shows a block diagram of an alternate embodiment of a beacon system capable of interfacing to a radio astronomy center and transmitting a beacon control signal to a subscriber unit.

FIG. 8 shows a block diagram of an alternate embodiment of a beacon system capable of interfacing to a radio astronomy center and transmitting a beacon control signal to a subscriber unit.

Radio astronomy center 43 activates beacon system 44' by asserting activate beacon signal 79. Activate beacon signal 79 is detected by I/O interface 150. I/O interface 150 interfaces to processor 74. Beacon status 80, output by beacon system 44', indicates that beacon system 44' is operative. One skilled in the art would understand that activate signal 79 could be a power switch to beacon system 44' or any other input to beacon system 44' requesting beacon service. Additionally, beacon status 80 could be any indicator or could be absent if desired.

Beacon system 44' also comprises beacon antenna 40, and transmitter 72. Beacon antenna 40 may be any suitable antenna capable of emanating beacon frequencies. Beacon antenna 40 must also be capable of propagating the desired pattern to create a suitable protection zone 58.

Upon activation of beacon system 44', time synchronization takes place between beacon system 44' and satellite 14. A precision time source 153 is synchronized to universal time. Satellite 14 is also synchronized to universal time. Beacon system 44' receives universal time from precision time source 153. I/O interface 150 receives universal time through a universal time input 154. Beacon system 44' is programmed to know when satellite 14 broadcasts a satellite control signal and may now simulcast beacon control signals with satellite control signals. Precision time source 153 may be resident within radio astronomy center 43.

Transmitter 72 transmits beacon control signal 46, 48, and 54. Transmitter 72 power level may be adjusted to provide appropriate beacon control signal levels to all subscriber units within protection zone 58.

Processor 74 and memory 75 are coupled together to perform sequencing and execution functions and to process and generate information contained in satellite and beacon control signals. Beacon system 44' repeatedly monitors universal time input 154 to determine required delay for transmission of subsequent beacon control signals.

Figure 9:
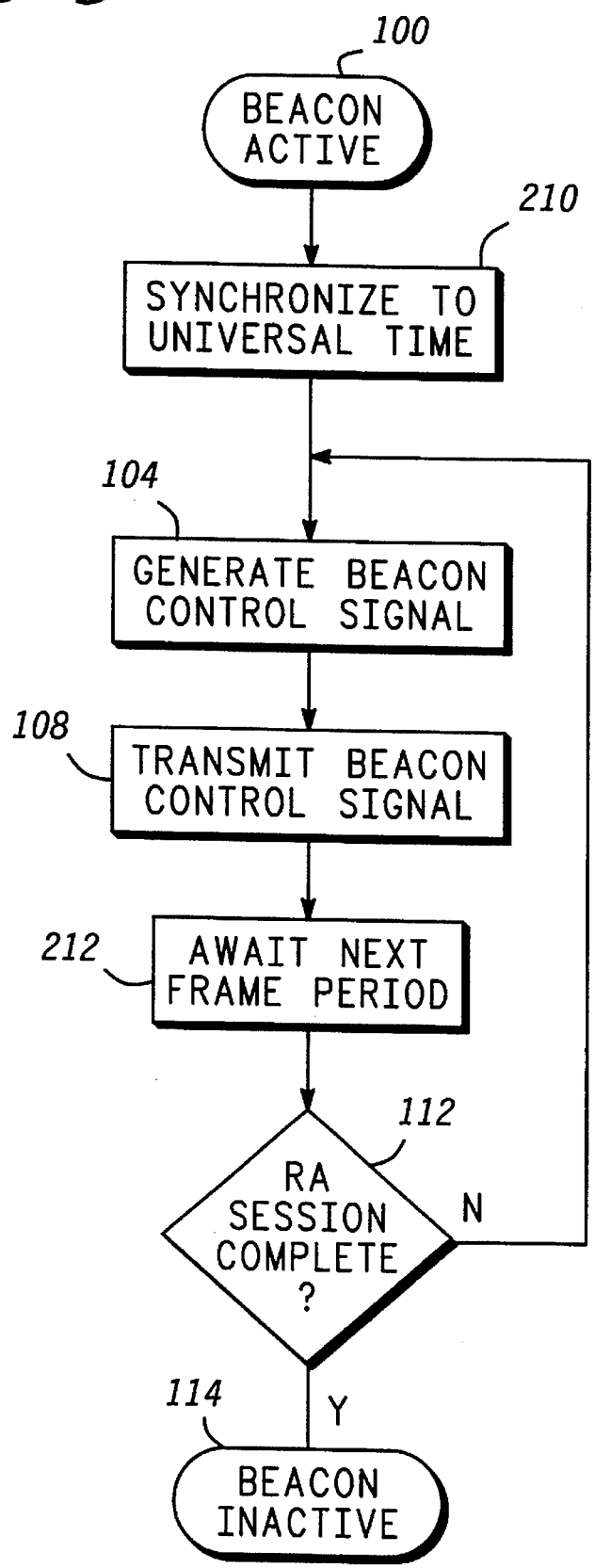
FIG. 9 shows a flowchart of an alternate embodiment of a beacon system's process of denying transmission opportunities to subscriber units while in a protection zone during a radio astronomy session.

FIG. 9 shows a flowchart of an alternate embodiment of a beacon system's process of denying transmission opportunities to subscriber units while in a protection zone 58 during a radio astronomy session. When beacon active procedure 100 is first entered, a task 210 is performed to synchronize beacon system 44' with satellite control signal 53. A precision time source 153 is synchronized to universal time. Satellite 14 is also synchronized to universal time. Beacon system 44' receives universal time from precision time source 153 (FIG. 8) through a universal time input 154. This synchronization allows the higher-powered beacon control signal 46 to over-power satellite control signal 50 in protection zone 58.

After task 210, a task 104 generates a beacon control signal 130 (FIG. 5). Beacon control signal 130 comprises control information and instructions that prohibit subscriber unit 49 from transmitting while in protection zone 58. Beacon control signal 130 also contains a preamble 132 for aiding subscriber units in capturing control signals.

After task 104, a task 108 transmits a beacon control signal. Synchronized beacon control signal 46, arriving at subscriber unit 49 close in time to satellite control signal 50, will have a higher received-power level and therefore be captured by subscriber unit 49.

After task 108, a task 212 monitors universal time from precision time source 153 to generate accurate delay between subsequent beacon control signal transmissions. This delay could also be created by separate timer 78 or by an internal timer in processor 74 as in the preferred embodiment.

Following task 212, a query task 112 determines whether a radio astronomy session has been completed. Completion of the session is detected by the removal of activate beacon signal 79. If the session has not terminated, then execution returns to task 104 for generation of another beacon control signal 130. If information in subsequent beacon control signals remains constant with the initial beacon control signal, then beacon control signal 130 may be stored and reused throughout the duration of the session or even across multiple sessions if signal information remains constant. If the session has been completed, then processing transitions to a beacon inactive state 114.

These and other changes and modifications which are obvious to those skilled in the art are intended to be included within the scope of the present invention.

Thus there has been described herein a concept, as well as several embodiments including a preferred embodiment, of a beacon protection system and method in which potentially interfering subscriber unit transmissions are inhibited within a transmission sensitive area defined as a protection zone.

Because the various embodiments of the beacon protection system and method as herein-described do not require subscriber units to incorporate special beacon receivers, subscriber units perform with a significant improvement in cost and efficiency.

Additionally, since beacons inhibit transmissions locally within a protection zone, subscriber unit communications outside of this zone are not impacted.

Furthermore, the above invention could protect any emission-sensitive regions such as airports, airplanes, non-participating geo-political regions desiring to prohibit subscriber units use, and the like.

It will be apparent to those skilled in the art that the disclosed invention may be modified in numerous ways and may assume many embodiments other than the preferred form specifically set out and described above.

What is claimed is:

1. A method of inhibiting a subscriber unit in a satellite communications system from transmitting within a protection zone, said method comprising the steps of:

(a) transmitting a beacon control signal synchronously with a satellite control signal to said subscriber unit within said protection zone, said beacon control signal comprising a transmission-prohibiting parameter;

(b) receiving at said subscriber unit said beacon control signal synchronously with said satellite control signal, said beacon control signal containing said transmission-prohibiting parameter and dominating said satellite control signal; and (c) inhibiting said subscriber unit's transmission capability in response to reception of said transmission-prohibiting parameter in said beacon control signal.

2. The method of claim 1, wherein said protection zone encompasses a radio astronomy site.

3. The method of claim 1, wherein step (a) further comprises indicating that said beacon control signal is being transmitted.

4. The method of claim 1, wherein said control signals are transmitted in periodic bursts followed by a fixed-duration time delay.

5. In a satellite communications system comprising at least one transmitter for transmitting a communications signal including a first control signal, at least one subscriber unit, and a protection zone within the area of coverage of said at least one transmitter, wherein a beacon control signal is transmitted synchronously with said first control signal within said protection zone, a method of inhibiting said at least one subscriber unit from transmitting within said protection zone, said beacon control signal comprising a transmission-prohibiting parameter, said method comprising the steps of:

(a) said at least one subscriber unit receiving said beacon control signal synchronously with said first control signal, said beacon control signal containing said transmission-prohibiting parameter and dominating said first control signal; and (b) inhibiting said at least one subscriber unit's transmission capability in response to reception of said transmission-prohibiting parameter in said beacon control signal.

6. The method of claim 5, wherein said protection zone encompasses a radio astronomy site.

7. The method of claim 6, wherein the power level of said beacon control signal is greater than that of said first control signal within said protection zone, and wherein step (a) further comprises capturing said beacon control signal within said protection zone and capturing said first control signal outside of said protection zone.

8. The method of claim 5, wherein said control signals are transmitted in periodic bursts followed by a fixed-duration time delay.

9. A satellite communications system for inhibiting a subscriber unit from transmitting within a protection zone, said system comprising:

(a) means for transmitting a beacon control signal synchronously with a satellite control signal to said subscriber unit within said protection zone, said beacon control signal comprising a transmission-prohibiting parameter;

(b) means for receiving at said subscriber unit said beacon control signal synchronously with said satellite control signal, said beacon control signal containing said transmission-prohibiting parameter and dominating said satellite control signal; and (c) means for inhibiting said subscriber unit's transmission capability in response to reception of said transmission-prohibiting parameter in said beacon control signal.

10. The system of claim 9, wherein said system is a global telecommunications system comprising at least one satellite, said at least one satellite comprising a transmitter for transmitting a communications signal including a satellite control signal, said transmitting means being located proximate to said protection zone, and said transmitting means being synchronized to said transmitter, whereby said beacon control signal dominates said satellite control signal within said protection zone.

11. The system of claim 10, wherein said control signals are transmitted in periodic bursts followed by a fixed-duration time delay.

12. The system of claim 9, wherein said system is a global telecommunications system comprising at least one satellite, said at least one satellite comprising a transmitter for transmitting a communications signal including a satellite control signal, said transmitting means being located proximate to said protection zone, and said transmitter and said transmitting means being synchronized to a time source, whereby said beacon control signal dominates said satellite control signal within said protection zone.

13. The system of claim 12, wherein the power level of said beacon control signal is greater than that of said satellite control signal within said protection zone.

14. The system of claim 9, wherein said protection zone encompasses a radio astronomy site.

15. In a satellite communications system comprising at least one transmitter transmitting a communications signal including a satellite control signal, at least one subscriber unit, and a protection zone within the area of coverage of said at least one transmitter, wherein a beacon control signal is transmitted synchronously with said satellite control signal within said protection zone, said satellite control signal and said beacon control signal having a similar format, circuitry for inhibiting said at least one subscriber unit from transmitting within said protection zone, said beacon control signal comprising a transmission-prohibiting parameter, said circuitry comprising:

(a) a single means for synchronously receiving at said at least one subscriber unit both said satellite control signal and said beacon control signal within said protection zone, said beacon control signal containing said transmission-prohibiting parameter and dominating said satellite control signal; and (b) means for inhibiting said at least one subscriber unit's transmission capability in response to reception of said transmission-prohibiting parameter in said beacon control signal.

16. The system of claim 15, wherein said protection zone encompasses a radio astronomy site.

17. The system of claim 15, wherein the power level of said beacon control signal is greater than that of said satellite control signal within said protection zone, and wherein said single means for synchronously receiving captures said beacon control signal within said protection zone and captures said satellite control signal outside of said protection zone.

18. The system of claim 15, wherein said control signals are transmitted in periodic bursts followed by a fixed-duration time delay.

* * * * *